A. HEADLEY.
TRUCK BRAKE.
APPLICATION FILED MAR. 27, 1915.
1,148,772.                                    Patented Aug. 3, 1915.
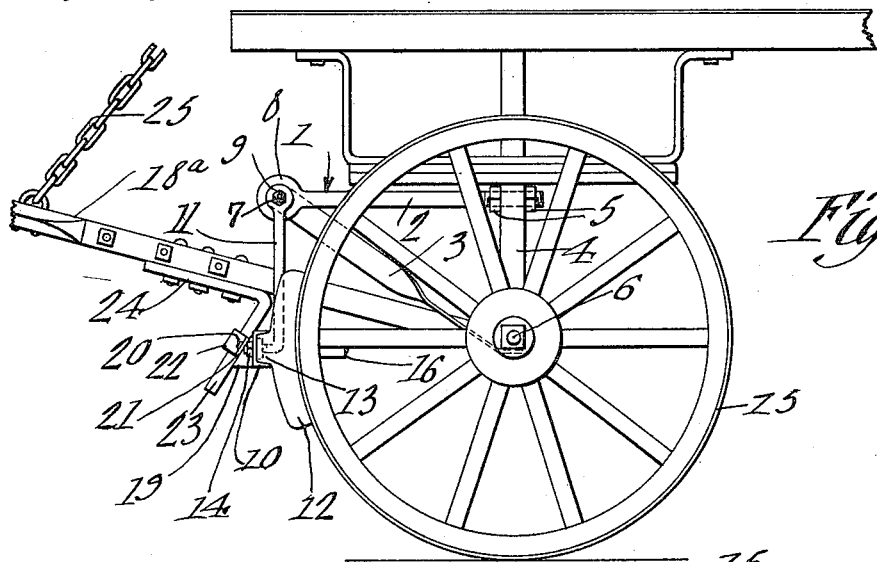
*Fig. 1.*
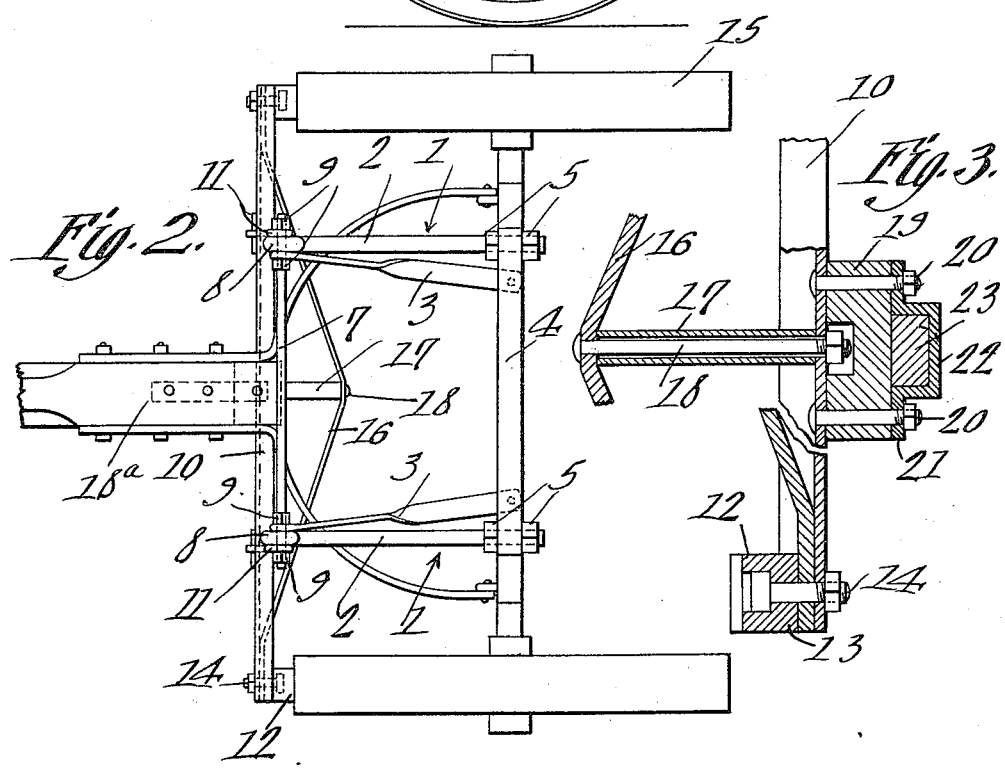
*Fig. 2.*   *Fig. 3.*
Witnesses                                        A. Headley
                                                        Inventor
                                    by   C. A. Snow & Co.
                                                        Attorneys

UNITED STATES PATENT OFFICE.

ALBERT HEADLEY, OF TWO HARBORS, MINNESOTA.

TRUCK-BRAKE.

1,148,772.   Specification of Letters Patent.   Patented Aug. 3, 1915.

Application filed March 27, 1915. Serial No. 17,474.

*To all whom it may concern:*

Be it known that I, ALBERT HEADLEY, a citizen of the United States, residing at Two Harbors, in the county of Lake and State of Minnesota, have invented a new and useful Truck-Brake, of which the following is a specification.

The present invention appertains to a brake for baggage and similar trucks, and aims to provide a brake mechanism carried by a truck and adapted to be operated by the tongue or handle, whereby when the tongue or handle is released it will by its gravity apply the brake shoes to the wheels for holding the truck stationary, the brake shoes being released as soon as the tongue or handle is swung upwardly.

Another object of the invention is the provision of a brake mechanism of novel and improved construction whereby it may be conveniently applied to a baggage truck to coöperate with the tongue or handle and adjacent wheels, and whereby the mechanism is operative in a thoroughly practical and efficient manner for automatically swinging the brake shoes into and out of engagement with the wheels when the tongue is lowered and raised.

It is also within the scope of the invention to provide a brake device for trucks which is comparatively simple, non-encumbering and inexpensive in construction, as well as being convenient, practical, serviceable and efficient in use.

With the foregoing and other objects in view which will appear as the description proceeds, the invention resides in the combination and arrangement of parts and in the details of construction hereinafter described and claimed, it being understood that changes in the precise embodiment of the invention herein disclosed can be made within the scope of what is claimed without departing from the spirit of the invention.

The invention is illustrated in the accompanying drawing, wherein:—

Figure 1 is a fragmental side elevation of one end portion of a baggage truck illustrating the brake mechanism applied to the steering gear. Fig. 2 is a plan view of the mechanism as applied. Fig. 3 is an enlarged sectional detail of the brake beam and accompanying parts, portions being broken away.

In carrying out the invention, there is provided a pair of brackets 1, each of which comprises a horizontal rod 2 and an inclined bar 3. The brackets 1 are adapted to be carried by the axle and axle frame of the truck so as to project forwardly. Thus, the rear end portions of the rod 2 are engaged through suitable apertures provided in the axle frame 4, and nuts 5 are threaded upon the rods 2, to clamp the same to the axle frame 4, while the lower ends of the bars 3 are secured in any suitable manner to the lower surface of the axle 6. The bars 3 are each provided with a twist between their ends whereby the opposite end portions of the bars 3 will be disposed in the proper planes. A transverse rod 7 is carried by the forward or free ends of the brackets 1, the forward or free ends of the rods 2 having eyes 8 embracing the rod 7, and the upper or free ends of the bars 3 being apertured and engaging the rod 7 next inside the eyes 8. Nuts 9 are threaded upon the rod 7 for clamping the forward ends of the respective members or sections 2 and 3 of the two brackets. A transverse brake beam 10, preferably constructed of channel iron, is hung from the rod 7 by means of a pair of hangers 11 which have their lower ends secured to the brake beam 10, and the upper ends of the hangers 11 are engaged to or embrace the rod 7 between the outer nuts 9 and the eyes 8. The brackets 1 thus carry the suspended brake beam 10, and brake shoes 12 are secured to the ends of the brake beam 10. The web of the beam 10 is disposed forwardly so that the flanges of the brake beam project rearwardly, and the brake shoes 12 are provided intermediate their ends with forwardly projecting lugs 13 fitting within the ends of the brake beam 10, bolts 14 being secured through the brake shoes 12 and the end portions of the beam 10 for fastening the brake shoes in place. The lugs 13 of the brake shoes fitting within the end portions of the beam 10 will prevent the shoes from turning. The brake shoes 12 coöperate with the wheels 15 which are journaled upon the ends or spindles of the axle 6. The brackets 1 are disposed between the wheels 15, and the rod 7 terminates short of the wheels 15, while the ends of the brake beam 10 project beyond the inner sides of the wheels 15 so that the brake shoes 12 will be capable of bearing against the tires or peripheries of the wheels 15. The brake beam 10 and its shoes 12 are disposed in front of the wheels.

The brake beam 10 is braced or reinforced by means of a truss bar or strip 16 having its ends clamped between the end portions of the brake beam 10 and the brake shoes 12, a tubular truss 17 being disposed between the intermediate portion of the truss bar 16 and the intermediate portion of the brake beam 10. The truss bar 16 lies in rear of the brake beam, and the truss 17 projects rearwardly from the said beam, so that the bracing or reinforcing structure will lie in rear of the brake beam between the wheels 15. A bolt or securing element 18 is engaged through the truss bar 16, truss 17 and brake beam 10, and the ends of the truss bar 16 are engaged by the bolts 14. The truss structure will resist the rearward pressure given to bear upon the intermediate portion of the brake beam, which tends to bow or bend the brake beam rearwardly.

As a means for operatively connecting the brake beam with the tongue or handle 18$^a$ of the truck, a wedge-shaped block 19 is secured by means of bolts 20 to the intermediate portion of the brake beam in front of same, so that the forward face of the block 19 is inclined rearward. A strip 21 is clamped against the front face of the block 19 by means of the bolts 20, and the intermediate portion of the strip 21 is offset forwardly, as at 22, to provide a guide through which the depending arm 23 of an angular or knee-shaped member or bar 24 is slidable. The other arm of the member or bar 23 is bolted to the lower surface of the tongue or handle 18$^a$. The arm 23 bears against the block 19. A safety chain 25 may be employed, as usual, for supporting the tongue or handle 18$^a$.

The brake mechanism may be readily applied to the truck, and will not appreciably encumber the same. When the tongue or handle 18$^a$ is raised, the depending arm 23 carried by the tongue 18$^a$ will be sprung forwardly and upwardly, and will carry the clip or strip 21 therewith. This will swing the brake beam 10 forwardly to move the brake shoes away from the wheels 15, and whereby the truck may be readily pulled or pushed about. As soon as the tongue 18$^a$ is released, it will swing downwardly by gravity, and the depending arm 23 will be swung downwardly and rearwardly and will push the brake beam 10 rearwardly so that the brake shoes bear against the wheels 15 to exert a braking action thereagainst for preventing the truck from moving. The present mechanism therefore operates automatically to bring the brake shoes into and out of frictional engagement with the wheels when the tongue is lowered and raised, whereby a person in grasping the tongue and raising the same slightly may readily trundle the truck about, but as soon as the tongue is released, the brake mechanism will be immediately applied to prevent further movement of the truck. The advantages of this appliance will be obvious from the foregoing, taken in connection with the drawing.

It will be noted that the tongue 18$^a$ projects forwardly considerably from the arm 23, whereby the weight of the tongue will exert a considerable rearward pressure against the brake beam when the tongue is free, and it is also to be noted that the truss structure of the brake beam will resist the rearward bowing of the brake beam when the brake mechanism is applied to the wheels.

Having thus described the invention, what is claimed as new is:

1. A truck brake comprising a brake shoe carrying member, a brake shoe carried by said member for coöperating with a truck wheel, means for hanging said member for swinging movement adjacent the said wheel, and an arm slidably engaging said member and adapted for attachment to the tongue of a truck.

2. A truck brake comprising a brake beam, brake shoes carried thereby for coöperation with the wheels of a truck, means for hanging the brake beam for oscillatory movement adjacent the said wheels, and an arm slidably engaging the intermediate portion of the brake beam and attachable to the tongue of the truck.

3. A truck brake comprising brackets attachable to a truck, hangers hung from said brackets, a brake beam carried by the hangers, brake shoes carried by the brake beam for coöperation with the wheels of the truck, and an arm slidably engaging the brake beam and attachable to the tongue of the truck.

4. A truck brake embodying a brake beam, brake shoes carried thereby, means for hanging the beam adjacent a pair of truck wheels so that the shoes can swing into and out of engagement with said wheels, a wedge-shaped block secured to the beam between the ends of the beam, a guide carried by said block, and an arm attachable to the tongue of a truck and sliding through said guide, said arm bearing against said block.

5. A truck brake comprising a brake beam, brake shoes carried by the ends thereof, a truss bar terminally attached to the ends of said beam, a truss between the intermediate portions of the beam and truss bar, and an arm slidably engaging the intermediate portion of the brake beam and attachable to the tongue of a truck.

In testimony that I claim the foregoing as my own, I have hereto affixed my signature in the presence of two witnesses.

ALBERT HEADLEY.

Witnesses:
A. G. JOHNSON,
T. M. KIRKBY.

Copies of this patent may be obtained for five cents each, by addressing the "Commissioner of Patents, Washington, D. C."